(12) United States Patent
Pfänder et al.

(10) Patent No.: US 12,531,418 B2
(45) Date of Patent: Jan. 20, 2026

(54) METHOD FOR SUPPLYING A CONSTRUCTION SITE WITH ELECTRICAL ENERGY AND ENERGY SUPPLY STATION FOR THE ELECTRIFICATION OF CONSTRUCTION SITES

(71) Applicant: Liebherr-Electronics and Drives GmbH, Biberach an der Riß (DE)

(72) Inventors: Mathias Pfänder, Maselheim (DE); Fabian Zell, Mittelbiberach (DE); Phillipp Suhm, Biberach (DE); Andre Schmitz, Ulm (DE)

(73) Assignee: Liebherr-Electronics and Drives GmbH, Biberach an der Riss (DE)

( * ) Notice: Subject to any disclaimer, the term of this patent is extended or adjusted under 35 U.S.C. 154(b) by 222 days.

(21) Appl. No.: 18/221,656

(22) Filed: Jul. 13, 2023

(65) Prior Publication Data
US 2024/0022076 A1 Jan. 18, 2024

(30) Foreign Application Priority Data
Jul. 14, 2022 (DE) .................... 10 2022 117 640.1

(51) Int. Cl.
*B60L 58/12* (2019.01)
*B60L 1/00* (2006.01)
*H02J 3/32* (2006.01)

(52) U.S. Cl.
CPC .............. *H02J 3/32* (2013.01); *B60L 1/003* (2013.01); *B60L 58/12* (2019.02);
(Continued)

(58) Field of Classification Search
None
See application file for complete search history.

(56) References Cited

U.S. PATENT DOCUMENTS 8,588,991 B1 * 11/2013 Forbes, Jr. ........ H02J 13/00028
700/297
9,819,194 B2 * 11/2017 Joko ................. H02J 3/144
(Continued)

FOREIGN PATENT DOCUMENTS

EP 3979452 A1 4/2022

OTHER PUBLICATIONS

Office Action from European Application No. 23181222.3 dated Feb. 13, 2024.
(Continued)

*Primary Examiner* — Michael C Zarroli
(74) *Attorney, Agent, or Firm* — Troutman Pepper Locke LLP; Ryan Schneider; Korbin Blunck (57) ABSTRACT

A method for supplying a site with energy and an energy supply station for supplying consumers, like construction machines with storage means for storing energy, a consumer connection for charging and/or supplying a corresponding consumer with power, a supply connection for connecting to an energy supply source and feeding electrical energy, and a power and/or energy control device for controlling the feeding and/or storing and/or releasing the electrical energy. Bidirectional communication between the power and/or energy control device and the connected consumers is present, wherein, on the basis of information transmitted by the consumers, energy demand is planned by the power supply station and the application of power to the consumer connections is controlled depending on the planned energy demand, and conversely, on the basis of the determined energy demand and certain characteristics of the energy supply station, control information for controlling the consumers is transmitted to the connected consumers.

16 Claims, 3 Drawing Sheets

(52) U.S. Cl.
CPC ....... *B60L 2200/40* (2013.01); *H02J 2310/48* (2020.01); *Y02B 70/3225* (2013.01)

(56) References Cited

U.S. PATENT DOCUMENTS

| | | | |
|---|---|---|---|
| 2018/0086330 A1* | 3/2018 | Ito | B60L 58/18 |
| 2018/0264955 A1* | 9/2018 | Gupta | G06Q 30/0283 |
| 2019/0317539 A1 | 10/2019 | Veda | |

OTHER PUBLICATIONS

Search Report from German Application No. 10 2022 117 640.1 dated Feb. 17, 2023.
Atlas Copco Power Technique GmbH "Ihre Saubere und Leise Energiequelle," 2021 Hamburg URL:https://wwwecap-marine.com/files/content/pdf/eCap_Marine_H2PowerPac_DE.pdf [abgerufen am Sep. 8, 2022.

* cited by examiner

METHOD FOR SUPPLYING A CONSTRUCTION SITE WITH ELECTRICAL ENERGY AND ENERGY SUPPLY STATION FOR THE ELECTRIFICATION OF CONSTRUCTION SITES

CROSS-REFERENCE TO RELATED APPLICATIONS

This application claims priority under 35 USC § 119 to German patent application DE 10 2022 117 640.1, filed 14 Jul. 2023, the contents of which are incorporated herein by reference in its entirety as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The present invention relates to a method for supplying a construction site with electrical energy using an energy supply station. The invention further relates to a corresponding energy supply station for supplying consumers such as construction machines with electrical energy, comprising storage means for storing electrical energy, at least one consumer connection for charging and/or supplying a corresponding consumer such as a construction machine with electricity, at least one supply connection for connecting to an energy supply source and feeding electrical energy, as well as a power and/or energy control device for controlling the feeding and/or storing and/or releasing the electrical energy by the components, supply connection, storage means and consumer connection.

2. Background

In order to be able to operate construction sites with zero local emissions, the electrification of construction machines has recently gained in importance. The increase in electrified construction machines such as excavators, caterpillars, concrete mixers, plastering machines, earth drilling machines or cranes is expected to result in a significantly higher electrical energy demand on the corresponding construction site, which cannot always be provided by an external grid connection, especially in inner-city areas, at least not so far and at least not without further expansion of the supply network.

However, the problem of satisfying a temporarily increased energy demand is not limited to inner-city construction sites, but also applies to all types of large and small construction sites and specially to remote areas without access to energy supply, as can be the case, for example, with construction sites in nonurban areas, cable car construction, tunnel construction, new construction on a greenfield site or the construction of resettlement farms. Similarly, temporary power grid support is sometimes required for event arenas or emergency power is desired for critical infrastructure facilities such as hospitals, IT server systems, or underground/surface mining operations.

Until now, such temporary energy requirements have often been met with diesel generators, in which a diesel engine drives a generator to provide the required electrical energy. However, this eliminates local emission control and is also detrimental to the desired noise and sound level reduction.

For large construction sites or other major infrastructure measures, temporary utility buildings are therefore often erected to meet the increased energy demand, for example by laying additional supply lines or building smaller power plants, which is not very economical and is itself a difficult measure in remote regions.

It has therefore already been proposed to provide mobile energy supply stations with emission-free energy sources such as a fuel cell or with large energy storage units in the form of lithium-ion battery, which can be used to support an existing grid supply and cushion temporary peaks in demand.

For example, a container unit known as the "Big Battery Box" from the company Bredenoord is equipped with lithium-ion batteries, power electronics and a battery management system in order to store electricity from photovoltaic and wind power plants and make it available for supply.

Furthermore, a mobile power plant based on fuel cells is known from the company eCap Mobility under the product name "H2PowerPack", whereby the fuel cell is housed in a container together with lithium-ion batteries for the intermediate storage of energy, which is arranged on a trailerable chassis.

The solutions that are known so far make it difficult to meet the requirements of different consumers in the same way. The construction machines used on a construction site, for example, are regularly configured very differently from one another in-terms of their energy demand, available charging times, their storage capacities and their use, so that the charging or supply tasks are also very different.

In addition, the power requirement within a machine is also subject to strong fluctuations, wherein this does not only apply to the comparison between working operation and rest phases, in which the machine is switched off or only to be charged, but also affects working operation alone. Depending on the construction machine, short, high power-peaks can alternate with longer low-energy phases, or blockwise phases of relatively high energy demand can alternate with phases of lower energy demand. If we consider a crane, for example, high power peaks occur when lifting a load, while low power is required for load-free crane movements to position the hook.

However, usually not all construction machines are operated at the same time and regularly not all of them are operated at full power, so that an energy station would be oversized if all power peaks of the construction machines to be connected were simply added up for the design.

Starting from this, it is the object of the present invention to provide an improved energy supply station of the type which avoids the disadvantages of the prior art and develops the latter in an advantageous manner. Preferably, the aim is to create a flexibly deployable energy supply station that can be adapted to differently configured consumers and energy supply sources of different characteristics, which can operate independently and assist in the electrification of construction sites. In particular, the aim is to enable an adequate supply to all consumers without oversizing the storage means of the energy supply station and, at the same time, to avoid overloading the supply or even shutting it down. In addition, the efficiency of the energy supply is to be increased.

BRIEF SUMMARY OF THE DISCLOSURE

According to the invention, the task is solved with a method for supplying a construction site with electrical energy using an energy supply station, wherein different electrically-operable construction machines, such as a crane, excavator, crawler or truck mixer, are successively and/or simultaneously connected to the consumer connections of the energy supply station and are charged with electrical power and/or energy for operation and/or are supplied during operation by the energy supply station, characterised by bi-directional communication between a power- and/or energy-control-device of the energy supply station and the construction machines connected to the consumer connections, wherein, on the basis of information coming from the construction machine side, the energy- and/or power-demand is planned and/or controlled by the energy supply station and, on the basis of the determined energy- and/or power-demand and predetermined characteristics of the energy supply station, maximum permissible desired value presettings are transmitted to the connected construction machines for consideration by the construction machines.

According to the invention, the task also is solved with an energy supply station for supplying consumers such as construction machines with electrical power and/or energy, comprising storage means for storing electrical power and/or energy, a plurality of consumer connections for charging and/or supplying consumers such as construction machines with power, at least one supply connection for connecting to an energy supply source and feeding electrical power and/or energy, and a power and/or energy control device for controlling the feeding and/or storing and/or releasing of the electrical power and/or energy by the components supply connection, storage means and consumer connections characterized by a bi-directional communication device for bidirectional communication between the power and/or energy control device and the connected consumers, the power and/or energy control device comprising energy demand determining means for determining the power- and/or energy-demand on the basis of information transmitted from the consumers, and a control information module for providing control information to the connected consumers based on the determined power- and/or energy-demand and predetermined characteristics of the energy supply station.

According to the invention, the task also is solved with a method comprising receiving a respective resource request from one or more consumers, the resource being suppliable to the consumer by a resource station, and each consumer having an operational profile during a work period, determining a respective available resource amount for a requesting consumer based at least upon a total amount of resource requests, examination of each operational profile, and a total available amount of the resource available to the resource station, and sending the respective available resource amount to each requesting consumer.

The resource can be selected from the group consisting of electric energy, electrical power, and a combination thereof.

The consumer can be an electrically-operable machine.

The operational profile can comprise one or more of resource demand amounts used during operational phases and resource storage capacity The method can further comprise determining delivery characteristics of delivery of the resource to each consumer in order to maximize operation of each consumer during the work period.

The method can further comprise supplying a construction site with electrical energy using the resource station, charging one or more of the consumers with the resource, wherein different consumers are charged via successive and/or simultaneous connection to one or more consumer connections of the resource station, and wherein the receiving, determining and sending comprises bi-directional communication between a control device of the resource station and the consumers connected to the consumer connections, wherein, on the basis of the respective resource requests, the respective available resource amounts are determined by the resource station, and, on the basis of the determined resource amounts and predetermined characteristics of the resource station, maximum permissible desired value presettings are transmitted to the connected consumers.

It is therefore proposed to provide intelligent communication between the consumers and the energy supply station and, based on this, to execute a power management system that adequately supplies the consumers with required electrical energy and, on the other hand, avoids overloading the energy supply station even with slim dimensions. According to the invention, there is bi-directional communication between the power and/or energy control device of the energy supply station and the consumers connected to the consumer connections, wherein, on the basis of information transmitted by the consumers, the energy demand is planned by the energy supply station and the application of electrical power and/or energy to the consumer connections is controlled in dependence on the planned energy demand, and conversely, on the basis of the determined energy demand and certain characteristics of the energy supply station, control information for controlling the consumers is transmitted to the connected consumers.

Bi-directional communication tells the energy supply station what each connected consumer needs or wants in-terms of electrical power, enabling the energy supply station's power and/or energy control device to determine total energy demand and match it with the capabilities of the energy supply station. Conversely, bi-directional communication allows the connected consumers to know what and when the energy supply station is capable of providing electrical power, allowing the consumers to adjust their operation to the capabilities of the energy supply station and also to each other.

For example, control specifications about a maximum permissible power can be transmitted from the power and/or energy control device to the connected consumers. The control specifications on the maximum permissible power can be variably adjusted, for example, considering the planned, total energy demand to be retrieved from the energy supply station via the supply connections, and/or the filling level of the storage means of the energy supply station, and/or the amounts of electrical energy that can be fed in via the supply connection. The power requirements can be set for a limited period of time and/or for specific time windows in which, for example, a plurality of connected consumers have registered an increased power requirement at the same time.

In further development of the invention, the consumers, in particular their control devices such as a crane control device, are configured to adapt their machine operation in consideration of the transmitted power specifications, for example, to limit lifting and/or travel speeds and/or to shift work processes with increased power requirements into time windows that are not occupied by power specifications.

Conversely, the connected consumers can transmit to the energy supply station via bidirectional communication which amounts of energy and/or which power they require, whereby specific time durations and/or time windows can also be specified for these desired amounts of energy and/or power, if necessary, for example in such a way that a consumer requests a specific power for two hours the next morning. This can be automated, for example, by considering project data that the corresponding consumer can retrieve from, for example, a construction site computer or a so-called BIM. Such energy requirements or requests may also be manually entered by a user and transmitted to the power and/or energy control device, if necessary, and alternatively or additionally may be transmitted directly from a BIM server to the power and/or energy control device, if necessary.

As an alternative or in addition to a direct specification of power requirements, data can also be transmitted from the consumers to the energy supply station from which the power requirements can be derived or are derived indirectly. For example, setup states can be transmitted from which required services can be derived. This can be, for example, ballasting of a crane, since high lifting loads can be derived from high ballasting or, conversely, lower lifting loads from low ballasting.

Alternatively or additionally, a device type or device identification can also be transmitted from the corresponding consumer to the energy supply station, which can then determine the amount of energy required or requested, if necessary by referring to a database.

Alternatively or additionally, information about a required power can also be determined automatically by monitoring and analyzing a consumption profile. If, for example, the consumption profile shows an at least approximately constant consumption, it can be assumed that it is a loading operation that will not show any power peaks, while conversely, if power peaks occur, it can be concluded that it is a working operation and possibly also a specific machine such as a crane. Based on this information transmitted to the power and/or energy control device, the latter can then plan the energy demand and/or take action to charge the consumer connections or the corresponding consumer connection.

In further embodiments of the invention, the energy supply station may include a prioritization module, which may be part of the electronic power and/or energy control device, for prioritizing a single connected consumer or a plurality of connected consumers based on communicated consumer information, wherein the power and/or energy control device may be configured to control the application of electrical power and/or energy to the consumer connections of the energy supply station in dependence on the prioritization of the consumers connected thereto. For example, consumer connections to which higher priority consumers are connected can be provided with a higher amount of energy and/or a higher power and/or can be supplied with electrical energy on a priority basis, while conversely, consumer connections to which lower priority consumers are connected can be supplied with energy on a subordinate basis and/or can be supplied with a limited power or limited or smaller amounts of energy.

For example, the prioritization module may distinguish between a charging operation of a connected consumer and a working operation of a connected consumer, or may perform prioritization in dependence on charging and working operation, wherein information about charging operation and working operation may be transmitted from the connected consumers and/or may be determined based on a particular power profile characterizing a power tapped at a respective consumer connection. In particular, at a supply connection to which "only" one consumer to be charged is connected, the power provided can be temporarily reduced and/or reduced for the entire charging process. Alternatively, or additionally, a higher power and/or amounts of energy may be received at one or more supply connections to which one or more consumers that are in operation are connected.

Alternatively, or additionally, the prioritization module can be configured to consider consumer types and/or work operation phases of a consumer connected to a supply connection in each case, for example in such a way that construction machines that are indispensable for the operation of the construction site and whose nonoperation also paralyzes or delays other work processes on the construction site are given higher priority. Alternatively, or additionally, the prioritization can also be increased for a specific working phase of a connected consumer, wherein such a working phase can, for example, be registered by the corresponding consumer or transmitted via the bi-directional communication device. For example, if a crane has one or more heavy lifts to perform, the crane may informatively transmit a working phase of increased power demand to the power supply station, whereupon the power and/or energy control device may set the supply connection to which the crane is connected to an increased power level.

Alternatively, or additionally, the power and/or energy control device may also shut off and/or disconnect one or more energy supply connections according to the prioritization of the consumers connected thereto, if applicable. If, for example, a consumer is connected to a supply connection that only requires power for a charging process and whose charging process is also not time-critical, which can be transmitted informationally from the consumer to the energy supply station via the communication device, for example, this can be assigned a prioritization level of "low, time-uncritical", on the basis of which the supply connection can then be switched off or blocked if necessary, for example in order to be able to provide a higher amount of energy or power at another supply connection.

In order to operate efficiently and to be able to provide the available power or amounts of energy to the consumers actually in need without making major cuts to the supply connections, the power and/or energy control device can also be configured to put hardware modules that are not required within the energy supply station into a sleep mode and/or switch them off and only start them up again when the determined energy demand actually requires this. For example, frequency converters can be switched off modularly in a storage unit. Alternatively, or additionally, entire energy storage units can also be switched off during parallel operation if they are not required.

If power is required again at a supply connection which is supplied by a "sleeping" or switched-off hardware module or requires such a hardware module, or if a higher power is required, which can be communicated, for example, by transmitting corresponding information from the consumer connected thereto, the respective hardware module is started up again by the power and/or energy control device.

The bi-directional communication device can be designed in basically different ways, advantageously such that it does not require additional data cables between the energy supply station and the consumers. Advantageously, the bi-directional communication device can have a power LAN module or a power line module that can transmit the information between consumers and energy supply station via the power lines, by means of which the electrical energy is conducted to the correspondingly connected consumers via the consumer connections. Such power line communication eliminates the need for separate data line cables, although nevertheless, in alternative further embodiments of the invention, a network cable or breast cable or other data cable could be provided between the energy supply station and the consumers.

In an alternative further development of the invention, the bi-directional communication device can also be designed to operate wirelessly, for example having a radio transmission module. In further embodiments of the invention, the communication device may include a WLAN module and/or a Bluetooth module to communicate between the connected consumers and the energy supply station.

In order to be able to meet different supply requirements, it is advantageous to diversify the storage means of the energy supply station to equally meet different feeding and delivery conditions. According to the invention, the storage means for storing electrical energy comprise differently configured storage units with different storage technologies, which are controlled and/or operated by the power and/or energy control device in dependence on the corresponding connected consumers and/or the corresponding connected energy supply sources. By using different storage technologies, the energy supply station can consider different charging and/or supply requirements of different construction machines or other consumers and can be adapted to the respective available energy supply sources.

In an advantageous further development of the invention, the differently configured storage units can in particular comprise a fast-charge and/or fast-discharge storage unit, which can be charged and/or discharged particularly quickly, and a long-term storage unit for long-term storage of electrical energy. Such storage systems, which differ in-terms of charging/discharging times and/or storage times, can on the one hand supply and/or charge consumers that require high amounts of energy in the very short-term, while on the other hand the long-term storage unit can simultaneously supply consumers with lower energy demands over a longer period of time or store energy over longer time intervals.

For example, the storage units can differ from each other in their specific power density and/or their specific energy density and/or their charge/discharge times to meet different requirements.

In particular, at least one capacitor, for example in the form of a double-layer capacitor, can be provided as a storage unit in order to be able to serve high power-peaks at short notice and/or to be able to store high currents at short notice. On the other hand, in order to also be able to provide larger amounts of energy and/or store and/or release it over a longer period of time, in further development of the invention at least one accumulator and/or a battery, for example in the form of a lithium-ion accumulator and/or a lithium-ion battery, can also be provided as a storage unit. This allows higher power demands or amounts of energy to be covered over a longer period of time.

In order to be independent with regard to grid connections that may not be available locally, in further development of the invention, a fuel cell or a hydrogen/fuel cell can be provided as an energy supply source, with the aid of which, for example, a base load of the construction site or infrastructure object can be covered. The hydrogen/fuel cell may be connected or connected to the supply port.

Alternatively, or additionally, however, a supply network, for example the public supply network, can be connected via the supply connection.

Advantageously, the energy supply station has a plurality of supply connections in order to be able to connect differently configured energy supply sources, in particular a fuel cell and the supply network. Alternatively, or additionally, a plurality fuel cells or hydrogen/fuel cells can be connected simultaneously via several supply connections.

The storage means and preferably also the supply and consumer connections can advantageously be connected to power electronics or power electronic components via which the feeding and/or release of current to the respective components can be controlled. Such power electronic components may include, for example, converters such as frequency converters, current regulators such as DC/DC converters or DC/AC converters or AC/DC converters, although other power electronic components such as transistors, power MOSFETs, thyristors or IGBTs may also be provided to control the charging and/or discharging of the storage means and/or the injection and/or extraction of current via the consumers and/or supply connections.

In particular, bi-directional DC/DC controllers and/or bi-directional DC/AC controllers can be provided in order to be able to control the feeding and discharging equally or the current flow in opposite directions via the respective current controller component.

For example, a bi-directional DC/DC controller can be associated with each of the storage units, by means of which both feeding and releasing current to and from the corresponding storage unit can be controlled.

Alternatively, or additionally, such a bi-directional DC/DC controller and/or a DC/AC controller can also be associated with one of the consumer and/or supply connections in order to be able to control the current flows from and to a consumer or from and to an energy supply source.

Advantageously, the current controllers or converters can be interconnected and/or form a power electronic network between the storage means and the consumer or supply connections.

In order to be able to use the storage means intelligently and to charge or supply the consumers with energy efficiently, the power and/or energy control device may advantageously comprise energy demand determining means which determine the energy demand of the corresponding consumers connected to the energy supply station. Advantageously, the energy demand de-termination means are configured to determine the individual energy demand of a correspondingly connected consumer in order to be able to optimally control the amount of energy and/or power provided at the corresponding consumer connection individually for the correspondingly connected consumer. Alternatively, or additionally, the energy demand de-termination means can also be configured to determine the total energy demand of all consumers connected to the energy supply station.

Advantageously, it may be provided that a communication device for communicating with the consumers to be supplied is provided, preferably wireless, wherein the energy demand determining means is connected to the communication device and is adapted to determine the energy demand of the connected consumers based on the data received from the consumers via the communication device.

It can be further advantageously provided that the communication device is configured to query the operating data, in particular power and/or consumption data, of the consumers and to provide them to the energy demand determination means, which determine the energy demand of the connected consumers on the basis of the received operating data, in particular power and/or consumption data.

Depending on the determined individual and/or total energy demand of the connected consumers, the power and/or energy control device can control the operation of the different storage units, for example by controlling the associated power electronic components. For example, it can be variably defined from which storage unit which amount of energy or which power is taken and to which consumer connection which amount of energy or power is given. A particular consumer connection can receive energy from only one storage unit or can be supplied with electrical energy from differently configured storage units.

Advantageously, the storage units and/or the power electronic components are networked with each other and/or with the power and/or energy control device, in particular in such a way that information or data can be exchanged with each other and/or with the power and/or energy control device.

In further embodiments of the invention, the power and/or energy control device may include consumer identification means to identify a correspondingly connected consumer. For example, the consumer identification means may be connected to a sensor system at a corresponding consumer port, by means of which the consumer connected to the consumer connection may be identified. Alternatively, or additionally, a communication interface can also be provided, for example in the form of an RFID reader, in order to be able to identify a respective consumer by reading an RFID tag. Other identification variants, for example by reading in a marking, can also be provided.

Alternatively, or additionally, the consumer identification means can also recognize a correspondingly connected consumer on the basis of charging characteristics such as charging current or charging resistance.

Depending on the respective identified consumer, the power and/or energy control device can then control the application of current to the corresponding consumer connection from the storage means and/or from the at least one supply connection.

In an advantageous further development of the invention, the power and/or energy control device can also consider the corresponding energy supply source connected to the at least one supply connection and/or an operating parameter of the correspondingly connected energy supply source when controlling the further components of the supply station.

Advantageously, it can be provided that the power and/or energy control device comprises a scheduling module for predictively scheduling energy demand and/or energy provision at the at least one consumer connection, the scheduling module being configured to adapt the energy demand and/or energy supply in dependence on a deployment schedule for a plurality of consumers and/or a task schedule for one or more consumers.

It can be further advantageously provided that the scheduling module is connected via a/the communication device to a construction site master computer and/or the consumers to be supplied and is configured to query the deployment schedule and/or task schedule from the construction site control computer and/or the consumers to be supplied.

Advantageously, the power and/or energy control device can comprise energy source identification means to identify the correspondingly connected energy source and/or to determine characteristic parameters thereof in order to control further components of the supply station in dependence thereon.

For example, the power and/or energy control device may be configured to use power from a supply network connected to a supply connection directly to charge and/or supply a consumer connection and, if applicable, to charge the storage means if power is left over.

On the other hand, electricity coming from a hydrogen/fuel cell can, for example, be used primarily for charging the storage means, since such a hydrogen/fuel cell can advantageously cover a lower base load and thus achieve slow charging of a storage unit. In principle, however, other control strategies adapted to the correspondingly connected energy source are also possible, wherein the power and/or energy control device can provide different control strategies for different, connected energy supply sources.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein.

Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Thus, to facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
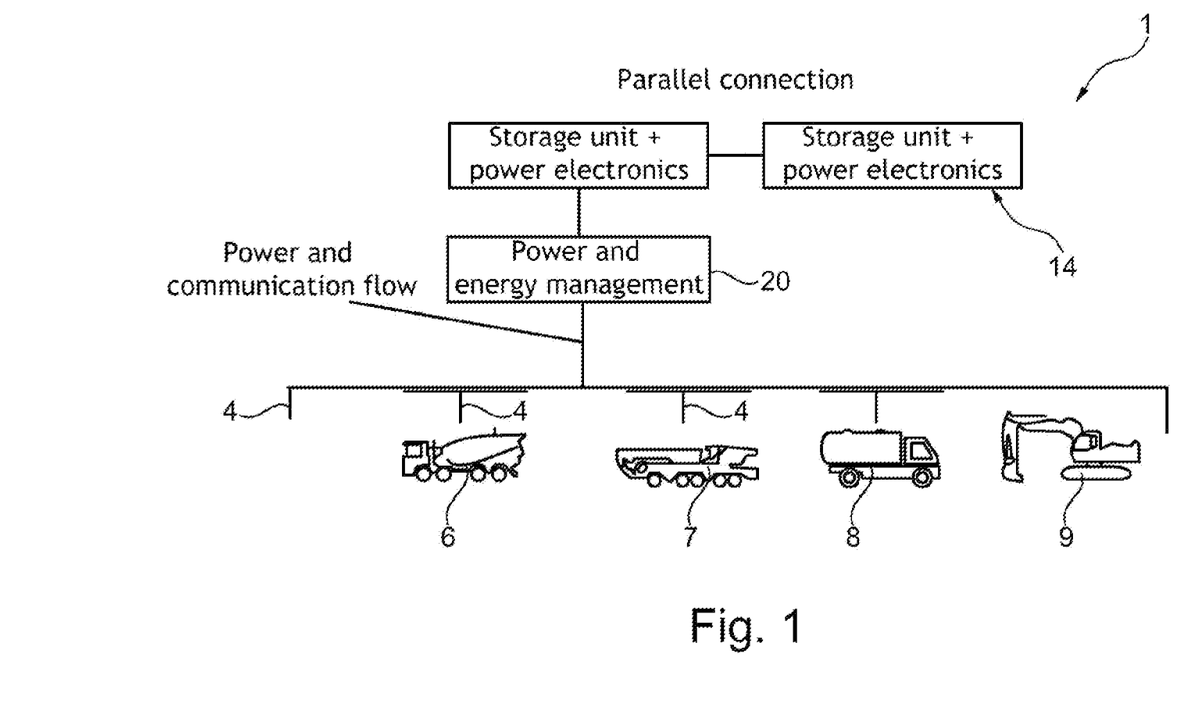
FIG. 1 shows a representation of an energy supply station and a plurality of consumers connected thereto in the form of various construction machines according to an advantageous embodiment of the invention, wherein the consumers are connected to the energy supply station via a power line communication in order to simultaneously exchange information bi-directionally via the power supply lines.
Figure 2:
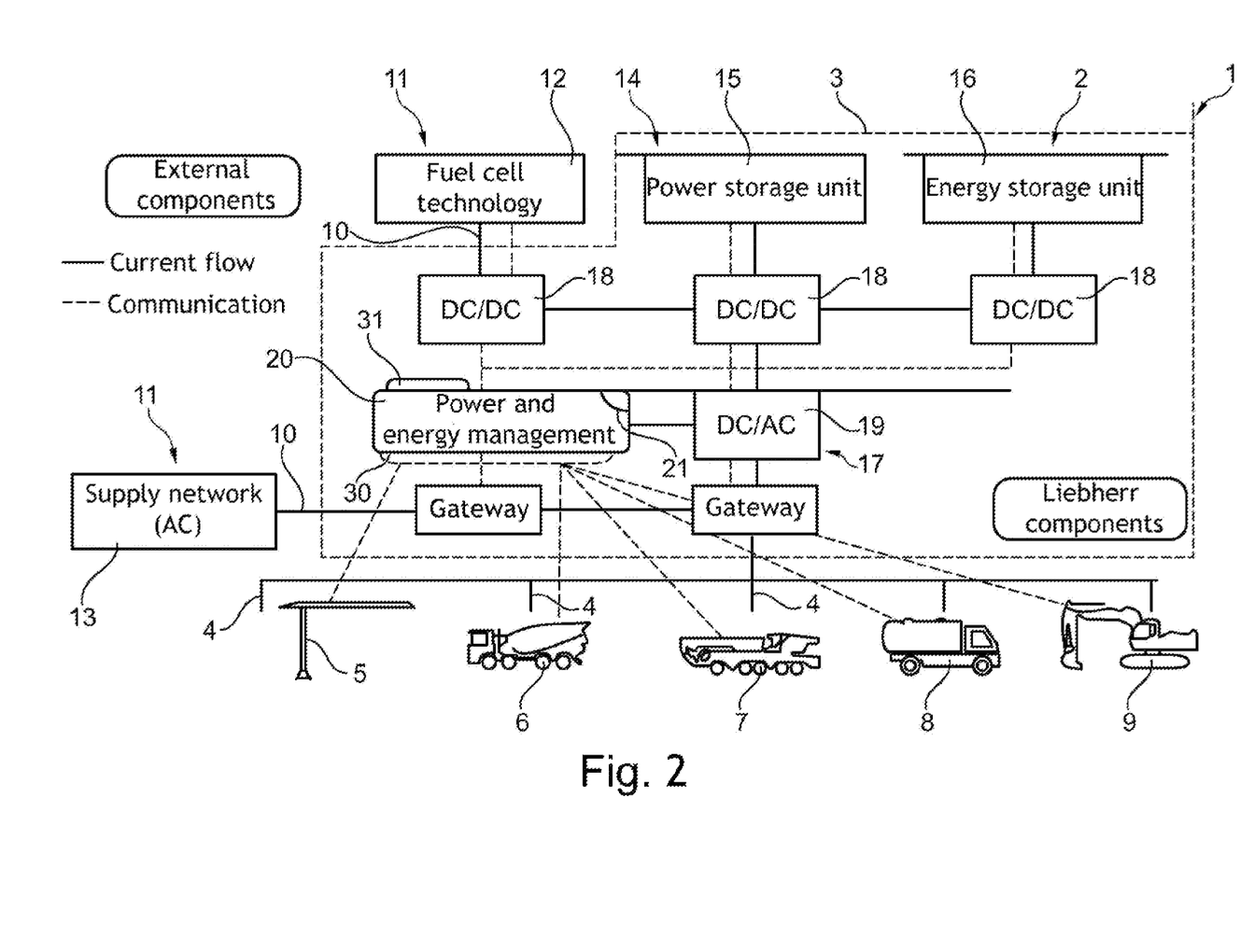
FIG. 2 shows the configuration of an energy supply station according to an advantageous embodiment of the invention for supplying power to a construction site and the construction machines used there.

The energy supply station 1, cf. FIG. 1 and FIG. 2, can advantageously form a mobile unit that can be moved from construction site to construction site, for example in the form of a container or a vehicle trailer. For example, the energy supply station 1 may include a housing 3 that may be mounted on the chassis of a trailer or may be transportable as a cargo item.

As FIG. 1 and FIG. 2 show, the energy supply station 1 can have a plurality of consumer connections 4 to which different consumers, for example in the form of construction machines and/or industrial trucks, can be connected in order to be charged and/or supplied with electrical energy. For example, the energy supply station 1 may be configured to supply electrical energy to different construction machines, such as a tower crane 5, a concrete mixer 6, a mobile crane 7, a dump truck 8, or a crawler excavator 9, or to charge batteries of these construction machines, which may allow the construction machines to operate electrically in an independent manner. It is understood that, of course, other construction machines can also be connected to one of the consumer connections 4 in order to be supplied with power or to be charged.

The consumer connections 4 can thereby form charging connections in order to charge batteries or accumulators of the correspondingly connected construction machine. Alternatively, or additionally, however, the consumer connections 4 can also form operating supply connections for supplying power directly to a working construction machine during operation, for example via a sufficiently long supply cable.

As FIG. 1 shows, the supply lines that conduct the electrical energy to the consumers via the consumer connections 4 can also be used for communication, in particular bi-directional communication, and can be part of a so-called powerline communication module that allows the energy supply station 1 to communicate with the different consumers 5-9 without having to provide additional data transmission lines.

As FIG. 2 further shows, the energy supply station 1 may further comprise a plurality of supply connections 10 to allow one or more energy supply sources 11 to be connected, for example a hydrogen/fuel cell 12 and/or a supply network 13, which may for example be a part of the public power grid.

Accordingly, the supply connections 10 may form a network connection and/or an energy cell connection.

The consumer connections 4 and/or the supply connections 13 can advantageously be arranged to be accessible from an outside of the energy supply station 1 and/or be configured as detachable connection connections, for example in the form of plugin connections, in order to be able to detachably connect a corresponding consumer 5, 6, 7, 8, 9 or a corresponding energy source 11 in a simple manner.

In order to be able to store the energy coming from the energy sources 11, the energy supply station 1 comprises storage means 14 which can be received or accommodated in the housing 3.

The storage means 14 thereby advantageously comprise differently configured storage units 15, which may have different storage characteristics and use different storage technologies. In particular, the storage means 14 may comprise a power storage unit 15 on the one hand and an energy storage unit 16 on the other hand. The power storage unit 15 can temporarily store and release very high amounts of power, while the energy storage unit can preferably store high amounts of energy for longer periods of time.

For example, a capacitor that can be charged and discharged quickly can be provided as the power storage unit 15, for example in the form of a double-layer capacitor, in order to cover short-term power-peaks and, if necessary, to be able to store high amounts of energy occurring at short notice. Such short-term backflowing, larger amounts of energy can occur, for example, when one of the connected construction machines is supplied with energy from the energy supply station 1 during operation, for example, via a supply cable, and is supplied, so to speak, from the energy supply station during network operation.

The energy storage unit 16, on the other hand, may be in the form of a battery or accumulator, such as a lithium-ion battery or other form of battery capable of storing high amounts of energy for extended periods of time. Such a battery as energy storage unit 16 can cover a larger energy demand over a longer period of time.

While the power storage unit 15 may be characterized by a very high specific power density, which may exceed that of a battery by one or more powers of ten, for example, the energy storage unit 11 may be characterized by a very high specific energy density, which may exceed that of the power storage unit 15 by one or more powers of ten.

To supply and discharging current from the storage means 14 and to supply current to the consumer connections 4, the energy supply station 11 comprises power electronics 17, which may comprise several power electronic components such as current converters, current controllers, switching elements or other components such as IGPTs, thyristors or transistors.

In particular, the power electronics 17 may include DC/DC converters or DC/DC controllers that can be used to control the flow of current into or out of the storage means. For example, in the case of a double-layer capacitor, the voltage changes depending on the filling state, which the DC/DC controller can consider when storing or drawing current. Such DC/DC converters or DC/DC controllers denote an electrical circuit capable of converting a DC voltage supplied at the input into a DC voltage with a higher, lower or inverted voltage level and capable of transferring energy from the high voltage level to the low voltage level, for example in order to charge the respective storage unit, and also transferring it in the other direction, i. e. storing it out or transferring it from the storage unit to the DC voltage circuit of the consumer system.

The DC/DC controllers 18 are advantageously configured to operate bi-directionally in order to be able to control both the storage and the drawing of current into and out of the corresponding storage element.

As FIG. 2 shows, each of the storage units 15, 16 can have such a DC/DC controller 18 associated with it or upstream of it. Such a DC/DC controller 18 can also be associated with or connected upstream of the supply connection 10 to which the hydrogen/fuel cell 12 is connected, cf. FIG. 2.

Further, the system may also include a DC/AC actuator 19 that may be upstream of the consumer connections 4 and/or may be upstream of the supply connection 10 to which the supply network 13 is connected. Such a DC/AC converter refers to an electrical circuit that can convert a DC voltage supplied at the input to an AC voltage with a higher, lower, equal or inverted voltage level and is capable of transferring energy from the high voltage level to the low voltage level. Advantageously, this DC/AC controller can also be configured to operate bi-directionally in order to be able to convert an AC voltage into a DC voltage in the manner.

As FIG. 1 shows, the components of the energy supply station 1 are controlled and/or regulated by a higher-level power and/or energy control device 20, the power and/or energy control device 20 being configured in particular to control the feeding and discharging of power to and from the storage units 15 and 16 and/or to control the application of power to the consumer connections 4 from the storage means 14 and/or from one of the supply connections 10 and/or to control the feeding of power from the supply connections 10.

As FIG. 2 shows, the power and/or energy control device 19 may be communicatively connected to the power electronics components, in particular the DC/DC controllers 18 and DC/AC controllers 19, to transmit actuating commands and/or receive feedback. Alternatively, or additionally, the power and/or energy control device 20 is also communicatively connected to the storage means 14 and/or communicatively connected to the energy source 11 connected to the respective supply connection 10 to be able to transmit control commands and/or receive feedback.

In this regard, the communication device 30 is bi-directional in order to transmit information from the energy supply station 1 to the different consumers 5-9 as well as, conversely, to transmit information from the consumers 5-9 to the energy supply station 1. As mentioned, the bi-directional communication device 30 may include a power-line communication module that enables communication over the power lines, which are used for power supply per se. Alternatively or additionally, wireless communication modules, in particular a radio module and/or a WLAN module and/or a Bluetooth module, can also be provided. Alternatively, or additionally, communication via a BUS or network cable connecting the consumers with the power supply station 1 and, if necessary, also with each other, can also be considered.

The power and/or energy control device 20 may include a data processing device comprising, for example, a microprocessor, a program memory, and a working memory to process corresponding signals and execute control routines.

In particular, the power and/or energy control device 20 may comprise energy demand determining means 21 to be able to determine the individual energy demand of the respective consumer connected to a consumer connection 4, in order to then control the application of energy to the respective consumer connection 4 in-terms of power and/or amounts of energy in dependence on the respective individually determined energy demand.

For this purpose, the control device 20 can determine which of the storage units 15 and 16 respectively provides how much power and/or energy or is provided at the corresponding consumer connection 10. For this purpose, the control device 20 can control the previously explained components of the energy supply station 1 in a corresponding manner.

Advantageously, the energy supply station 1 features intelligent control strategies as well as efficient energy management.

The energy and power control system 20 handles the communication of receiving data from different (a plurality of/a single) construction machine/machines 5-9, processing it, and providing corresponding energy to charge the construction machines 5-9 as needed. Communication can be wireless or via a direct connection.

The energy and power control 20 takes over the task of a predictive planning of energy provision for the different construction machines 5-9 and coordinates the efficient energy flow between storage medium and construction machine 5-9 for the optimized loading process with regard to different parameters (e. g. service life and costs) of the storage media.

The energy and power control system 20 has the intelligence to automatically detect which construction machine 5-9 requires how much energy at what time, and handles the scheduling and coordination of the different storage media for providing the energy and charging the construction machines 5-9.

The energy and power control system 20 optimizes the power flows based on predicted work processes of the construction machines 5-9 with regard to power consumption via the supply connection and the storage states of the different storage units.

The energy and power control system 20 has a permanent (wireless) communication to the different construction machines 5-9 for detecting the corresponding loading states. The energy and power control system has an external interface for retrieving different data for the planned work processes. Based on this data, the energy and power control system coordinate the energy flows and the provision of energy for charging the different construction machines 5-9 and ensures energetically optimized operation.

For example, in this case, control specifications regarding a maximum permissible power can be transmitted from the power and/or energy control device 20 to the connected consumers.

Alternatively, or additionally, time specifications for performing energy-intensive work and/or low-energy work may be communicated by the power and/or energy control device 20 to the connected consumers.

The implementation of the specifications can be done by the consumer, and the specifications can also be modified or refused by the consumer, if necessary, or reworked in other ways to make them compatible with the type of machine and/or work processes to be performed. Advantageously, the control and/or timing specifications transmitted to the consumers can thereby be processed by electronic control devices of the consumers 5-9 and used to influence control commands which are input at input means of the consumers 5-9 and/or are generated by control devices of the consumers 5-9 for automated work control, wherein in particular maximum travel speeds and/or maximum accelerations of working units are reduced on the control side and/or automated work cycles are time-shifted.

If, for example, a power restriction for a crane 5 is unacceptable due to a pending lifting task, the controller of the crane 5 can refuse to implement it and, if necessary, communicate this to the power and/or energy control device 20, whereupon the latter can then modify the specification if necessary and possibly impose greater power restrictions on other consumer connections 4 or consumers connected to them.

Alternatively or additionally, a single connected consumer or a plurality of connected consumers 5-9 can be prioritized by a prioritization module 40 on the basis of transmitted information from the construction machine, in which case the application of electrical power and/or energy to the consumer connections 4 is controlled in dependence on the prioritization of the consumers 5-9 connected thereto, in particular the distribution of energy to the various consumer connections 4 being controlled variably on the basis of the prioritization.

In this respect a single consumer connection or a plurality of consumer connections 4 can also be completely blocked and/or switched off in accordance with the prioritization of the consumers 5-9 connected to them.

In principle, the prioritization module 40 can perform prioritization in various ways. For example, suitable determining means can be provided for automatically determining operating states, which can determine at least a charging state and a working operating state of the consumers 5-9 connected to the consumer connections 4, based on which automatic prioritization can be performed.

Alternatively, or additionally, the prioritization can also be entered manually, for example by suitable input means for manually entering the prioritization of a single consumer or a plurality of consumers 5-9.

Prioritization can also be based on an identified consumer type or equipment condition.

Consumer identification means 22 may be provided for identifying the consumers 5-9 connected to the various consumer connections 4, and may be configured to variably control at least one of the power electronics, supply connection 10, storage means 14, and consumer connection 4 in dependence on the identified consumers 5-9.

The consumer identification means 22 may also communicate the identified consumers to the prioritization module.

For example, the consumer identification means 22 may include a sensor on at least one consumer port 4.

Alternatively, or additionally, the consumer identification means 22 may also be configured to determine the consumer 5-9 connected to a consumer connection 4 based on information transmitted from the consumer to the energy supply station 1.

To identify which consumer 5-9 is connected to which energy storage unit outlet, the consumer identification means 22 may also be configured to proceed as follows:

Based on the consumption profile, the power/energy management can independently detect which type of consumer or, depending on the uniqueness, exactly which consumer is connected. For example, a constant consumption can be identified as belonging to a charger of an E-appliance. Alternatively, occurring power peaks can identify a crane.

For this purpose, e.g., with the help of measuring equipment, the load profile (among other things via voltage dip, current, current peak and/or frequency change) a type of consumption measurement and/or an evaluation can take place in each socket, which is compared with the profile stored in the power/energy management.

In the case of power line communication, for example, the power/energy management system recognizes for each connection which device is plugged in for each connection, e.g., by means of an identifier. For this purpose, one communication device could be provided per connection.

The power/energy management recognizes, for example, via connection monitoring, on which connection a consumer was recently plugged in/unplugged.

Alternatively, the consumer can be set by input at the power management (e.g., at the energy storage unit).

In order to operate efficiently, the energy supply station 1 can put hardware components not currently required for supplying electrical power to the consumer connections, such as the power converters or DC/DC or DC/AC controllers, into a sleep mode and/or switch them off in order to reduce their standby consumption. If the function of the device that has been put to sleep is required again, it can be started up again in dependence on the determined energy demand.

Figure 3:
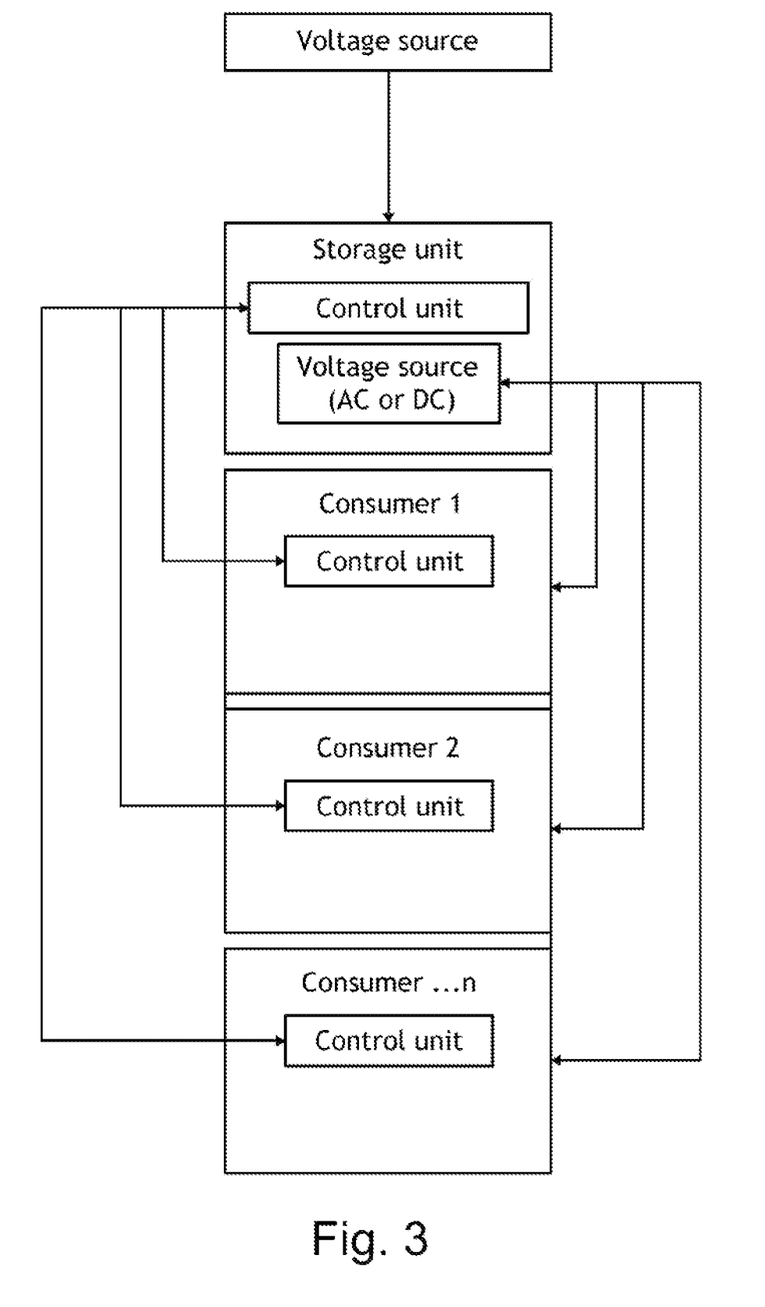
FIG. 3 shows a representation of the connection of a plurality of consumers to a storage unit of the energy supply station according to an advantageous embodiment of the invention.

As FIG. 3 shows, a storage unit can supply one or more consumers, by AC and/or DC.

The storage unit can be connected to a voltage source (DC or AC) for charging, but can also supply the consumer(s) 5-9 in standalone mode. The consumer and the storage unit preferably each contain their own control unit 20, see FIG. 3.

Thereby, a bi-directional communication may take place between the control unit 20 of the corresponding storage unit and the corresponding control unit of the consumer 5-9. For example, the control unit of the consumer(s) 5-9 sends data such as desired power, min. power, max. power, state (standby, charging, working, . . . ), machine type, charging target, and/or actual power to the control unit 20 of the storage unit.

Conversely, the storage unit control unit 20 may, for example, send data such as enabled power, fault data, diagnostic information, status (state of charge, standby, ready, state of charge warning, . . . ), . . . to the corresponding consumer.

Based on the information exchanged, it is possible to proceed, for example, as follows:

1. Collection of the power requirements of the consumer(s);
2. Power management balances and releases consumer-specific power. Optionally, a power reserve can be maintained for consumers that are not "intelligent" and/or one or more connections can be blocked. Here, performance management can be optimized by:
   Prioritization of power distribution by "input" or generally for machine types, adjustable if necessary;
   Self-optimization (if necessary "self-learning") with defined optimization target depending on "scenarios
   Working consumer>highest possible power throughput
   Charging consumers with lower prioritization;
3. The consumer(s) implement(s) the individual power limitation;
4. During longer periods of partial load, certain hardware scopes of the storage unit could be put into sleep mode to increase efficiency.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. A method comprising:
supplying a construction site with electrical energy using an energy supply station;
charging different consumers, being electrically operable construction machines that are successively and/or simultaneously connected to consumer connections of the energy supply station, with electrical power and/or energy for operation and/or are supplied during operation by the energy supply station:
wherein:
bi-directional communication takes place between a power- and/or energy-control device of the energy supply station and the consumers connected to the consumer connections, wherein, on the basis of information coming from a construction machine side, the energy- and/or power-demand is planned and/or controlled by the energy supply station and, on the basis of a determined energy- and/or power-demand and predetermined characteristics of the energy supply station, maximum permissible desired value presettings are transmitted to the connected consumers for consideration by the consumers;

control specifications comprising maximum permissible desired value for power, energy, current, consumption and/or load are transmitted to the connected consumer by the power and/or energy control device;

time specifications for carrying out power- and/or energy-intensive work and/or low-power and/or low-energy work are transmitted from the power and/or energy control device to the connected consumers; and the control and/or time specifications transmitted to the consumers are processed by electronic control devices of the consumers and are used to influence control commands which are input to the consumers and/or are generated by control devices of the consumers for automated work control.

2. The method of claim 1, wherein maximum travel speeds and/or maximum accelerations of working units are reduced on the control side and/or automated work cycles are time-shifted.

3. The method of claim 1, wherein a single consumer or a plurality of connected consumers are prioritized by a prioritization module on the basis of transmitted information from the consumer, and the maximum desired value defaults for the different consumers are adapted in dependence on the prioritization, and/or the distribution of energy and/or power to the different consumer connections is controlled variably on the basis of the prioritization.

4. The method of claim 3, wherein a single consumer connection or a plurality of consumer connections are blocked and/or switched off according to prioritization of the consumers connected thereto.

5. An energy supply station for supplying consumers with electrical power and/or energy comprising:
storage means for storing electrical power and/or energy;
consumer connections for charging and/or supplying consumers with power;
at least one supply connection for connecting to an energy supply source and feeding electrical power and/or energy;
a power and/or energy control device for controlling the feeding and/or storing and/or releasing of the electrical power and/or energy by the at least one; and
a bi-directional communication device for bi-directional communication between the power and/or energy control device and the connected consumers;
wherein the power and/or energy control device comprises:
an energy demand determining module for determining the power- and/or energy-demand on the basis of information transmitted from the consumers; and
a control information module for providing control information to the connected consumers based on the determined power- and/or energy-demand and predetermined characteristics of the energy supply station; and
wherein one or more of:
the power and/or energy control device comprises a prioritization module for prioritizing a single connected consumer or a plurality of connected consumers based on transmitted information concerning the consumers, wherein the power and/or energy control device is configured to adapt the maximum desired value defaults for the connected consumers in dependence on the prioritization and/or to control the distribution of power and/or energy to the consumer connections in dependence on the prioritization of the consumers connected thereto;

the prioritization module comprises determining means for automatically determining operating states comprising at least a charging state and a working operating state of the consumers connected to the consumer connections and automatically prioritizing in dependence on the determined operating state, and/or an input for manually inputting the prioritization of one or more consumers the system comprises;

the energy demand determining module is configured to individually determine the energy demand of a plurality of consumers connected to a plurality of consumer connections, respectively, and to control the maximum desired value defaults for the consumers in dependence on the individually determined energy demand and/or to control the distribution of power and/or energy to the consumer connections in dependence on the individually determined energy demand;

the bi-directional communication device is configured to query the operating data of the consumers and to provide the data to the energy demand de-termination means, which determine the energy demand of the connected consumers on the basis of the received operating data; or the power and/or energy control device comprises consumer identification means for identifying a corresponding consumer connected to the at least one consumer connection and is configured to variably control at least one of the components, the power electronics, the supply connection, the storage means and the consumer connection in dependence on the identified consumers.

6. The energy supply station of claim 5, wherein the bi-directional communication device comprises a powerline communication module for transmitting the information between the power and/or energy control device and the connected consumers via the consumer connections and the power lines connected thereto for supplying consumers with electrical power and/or energy.

7. The energy supply station of claim 5, wherein the bi-directional communication device comprises a wirelessly operating communication module for wireless transmission of the information between the power and/or energy control device and the consumers.

8. The energy supply station of claim 5, wherein one or more of:

the consumer identification means comprise a sensor system at the at least one consumer connection; or the consumer identification means is configured to determine the consumer connected to a consumer connection based on information transmitted from the consumer to the energy supply station.

9. An energy supply station for supplying consumers with electrical power and/or energy comprising:

storage means for storing electrical power and/or energy;

consumer connections for charging and/or supplying consumers with power;

at least one supply connection for connecting to an energy supply source and feeding electrical power and/or energy;

a power and/or energy control device for controlling the feeding and/or storing and/or releasing of the electrical power and/or energy by the at least one; and a bi-directional communication device for bi-directional communication between the power and/or energy control device and the connected consumers;

wherein the power and/or energy control device comprises:

energy demand determining means for determining the power- and/or energy-demand on the basis of information transmitted from the consumers; and a control information module for providing control information to the connected consumers based on the determined power- and/or energy-demand and predetermined characteristics of the energy supply station; and wherein one or more of:

the power and/or energy control device comprises energy source identification means for identifying the corresponding energy source connected to the at least one supply connection;

the power and/or energy control device is configured to control the application of current from the storage means to the at least one consumer connection and from the at least one supply connection in dependence on information transmitted from the connected consumers to the power and/or energy control device and information transmitted from the power and/or energy control device to the connected consumers; or the power and/or energy control device comprises a scheduling module for predictively scheduling the power and/or energy demand and/or power and/or energy provision at the at least one consumer connection, the scheduling module being configured to adapt the power and/or energy demand and/or power and/or energy provision in dependence on a deployment schedule for different consumers and/or a task schedule for one or more consumers.

10. The energy supply station of claim 9, wherein the scheduling module is connected via a/the communication device to a construction site master computer and/or to the consumers to be supplied and is configured to query the deployment schedule and/or task schedule from the construction site master computer and/or the consumers to be supplied.

11. The energy supply station of claim 5, wherein the energy supply station is configured as a mobile unit.

12. The energy supply station of claim 5, wherein the energy supply station is configured to operate emission-free and independently.

13. The energy supply station of claim 5, wherein the storage means comprise differently configured storage units of different storage technologies and the power and/or energy control device is configured to control the different storage units individually in dependence on the connected consumers and/or connected energy supply sources.

14. The energy supply station of claim 13, wherein the differently configured storage units comprise a power storage unit with high power density on the one hand and an energy storage unit with a high energy density, at least one fast-charge and/or fast-discharge storage unit for fast storage and/or discharge of high currents on the one hand, and at least one long-term storage unit for long-term storage of high amounts of energy on the other hand.

15. The energy supply station of claim 5 further comprising at least one supply network connected to the at least one supply connection, wherein the supply connection, to which the supply network is connected, is connectable to the at least one of the consumer connections past the storage means.

16. An energy supply station for supplying consumers with electrical power and/or energy comprising:
- storage means for storing electrical power and/or energy;
- consumer connections for charging and/or supplying consumers with power;
- at least one supply connection for connecting to an energy supply source and feeding electrical power and/or energy;
- at least one supply network connected to the at least one supply connection;
- a power and/or energy control device for controlling the feeding and/or storing and/or releasing of the electrical power and/or energy by the at least one; and
- a bi-directional communication device for bi-directional communication between the power and/or energy control device and the connected consumers;
- wherein the power and/or energy control device comprises:
  - energy demand determining means for determining the power- and/or energy-demand on the basis of information transmitted from the consumers; and
  - a control information module for providing control information to the connected consumers based on the determined power- and/or energy-demand and predetermined characteristics of the energy supply station;
- wherein the supply connection, to which the supply network is connected, is connectable to the at least one of the consumer connections past the storage means; and
- wherein the power and/or energy control device is configured to control the direct connection of the supply connection to one or more consumers past the storage means in dependence on the information transmitted by the consumers to the energy supply station.

* * * * *